United States Patent [19]

Sandage et al.

[11] Patent Number: 5,414,848

[45] Date of Patent: May 9, 1995

[54] METHOD AND APPARATUS FOR SHARING A COMMON ROUTINE STORED IN A SINGLE VIRTUAL MACHINE WITH OTHER VIRTUAL MACHINES OPERATING IN A PREEMPTIVE MULI-TASKING COMPUTER SYSTEM

[75] Inventors: David A. Sandage, Forest Grove; James C. Stanley; Stewart W. Hunt, both of Portland; Arland D. Kunz, Beaverton, all of Oreg.

[73] Assignee: Intel Corporation, Santa Clara, Calif.

[21] Appl. No.: 41,785

[22] Filed: Apr. 1, 1993

[51] Int. Cl.$^6$ .................................. G06F 9/40
[52] U.S. Cl. ...................... 395/650; 364/280; 364/281.3; 364/286; 364/228.2; 364/978.1; 364/978.2; 364/976
[58] Field of Search ............................ 395/650

[56] References Cited

U.S. PATENT DOCUMENTS

| | | | |
|---|---|---|---|
| 4,835,685 | 5/1989 | Kun | 364/200 |
| 4,849,880 | 7/1989 | Bhaskar et al. | 364/200 |
| 5,175,855 | 12/1992 | Putnam et al. | 395/700 |
| 5,265,251 | 11/1993 | Agarawal et al. | 395/650 |
| 5,305,461 | 4/1994 | Feigenbaum et al. | 395/775 |

OTHER PUBLICATIONS

Publication of the Personal Computer Memory Card International Association (PCMCIA) entitled: Card Srevices–Release 1.11; Sunnyvale, California, Aug. 16, 1992.
Publication of the Personal Computer Memory Card International Association (PCMCIA) entitled: PC–Compatible Socket Services Binding, Draft 2.00c; Sunnyvale, California, Sep. 12, 1992.
Publication of the Personal Computer Memory Card International Association (PCMCIA) entitled: PCMCIA Socket Services Interface Specification, Draft 2.00c; Sunnyvale, California, Sep. 12, 1992.
Eddon, Guy, "DDE to DOS", Windows–DOS Developer's Journal, Aug. 1993 vol. 4 No. 8 p. 63 (16).
Coutant, Cary A., "Shared libraries for HP–UX", Hewlett–Packard Journal, Jun. 1992 vol. 43 No. 3 p. 46 (8).
Martelli, Anastasia M., "A model for HP–UX shared libraries using shared memory on HP Precision Architecture computers", Hewlett–Packard Journal, Oct. 1989 vol. 40 No. 5 p. 86 (5).
Olsen, Thomas W., "Making Windows and DOS programs talk", Windows–DOS Developers Journal, May 1992 vol. 3 No. 5 p. 21 (14).

*Primary Examiner*—Kevin A. Kriess
*Assistant Examiner*—Mathew M. Payne
*Attorney, Agent, or Firm*—Blakely, Sokoloff, Taylor & Zafman

[57] ABSTRACT

A computer system contains an Intel TM 80386 or later microprocessor as a central processing unit (CPU) and a system memory coupled to the CPU. The computer system runs Microsoft TM Windows v. 3.1 operating system in enhanced mode. The system memory contains a system virtual machine (VM) and at least one DOS VM. A target VM contains shared code routines for use by all VMs loaded in the computer system. When access to the shared code routine is desired from a calling process in a calling VM, the calling VM transfers control and calling data parameters to a shared code virtual device driver (VxD). The shared code VxD performs data translation for the calling data parameters so that the target VM can access the data parameters. The shared code VxD invokes calls to a Windows Process scheduler to schedule the target VM and block selection of the calling VM. The target VM, upon invocation by the scheduler, executes the shared code routine and generates return parameters. Upon completion of the shared code routine, the thread of execution is transferred to the shared code VxD, and address translation is performed on the return parameters. The translated return data parameters are transferred to the calling process. The shared code VxD unblocks selection of the calling VM so that the calling VM is free for selection by the Windows process scheduler. When the calling VM is selection, the calling processes resumes execution.

16 Claims, 5 Drawing Sheets

METHOD AND APPARATUS FOR SHARING A COMMON ROUTINE STORED IN A SINGLE VIRTUAL MACHINE WITH OTHER VIRTUAL MACHINES OPERATING IN A PREEMPTIVE MULI-TASKING COMPUTER SYSTEM

BACKGROUND OF THE INVENTION

1. Field of the Invention

The present invention relates to the field of data processing, and more particularly, to the sharing of program code among virtual machines in a multi-tasking operating system environment.

2. Art Background

The Microsoft TM Windows version 3.1 operating system environment permits multi-tasking of program applications in an IBM TM compatible personal computer system. The Microsoft TM Windows V. 3.1 supports an enhanced mode. The Windows enhanced mode, in addition to the features found in the Windows standard mode, creates the use of disk operating system (DOS) virtual machines (VMs). Referring to FIG. 1, a memory map for a computer system configured for running Windows in enhanced mode is illustrated. The memory map 100 comprises a conventional memory area 110, ranging from 0 to 1.09 mega bytes (MB), and an extended memory area 125. Below 640 kilo bytes (KB) in the conventional memory area 110, resides an interrupt vector table 112, DOS files 114, device drivers 116, terminate and stay resident (TSR) programs 118, and an application area 120. In addition, a video area 122 and a system area 124 reside in an upper portion of the conventional memory area 110. In real mode, only the conventional memory area 110 is accessible to the computer system. The extended memory area 125 provides additional system memory for operation in protected mode.

The Windows enhanced mode utilizes a virtual 8086 mode on an Intel TM 80386 microprocessor to emulate a DOS environment for operation of each DOS VM. A first virtual machine holds Windows itself, all the Windows applications, and any DOS TSRs and device drivers which were started before Windows was loaded. This first virtual machine is known as the system virtual machine (system VM). The Windows enhanced mode supports a memory paging system which allows access to system memory up to 4 giga bytes (GB) for storing a number of DOS VMs and a system VM. The DOS VMs are limited to 1.09 MB of system memory. With the use of addition system memory, the Windows enhanced mode supports several DOS VMs concurrently. A VM is formed under protected mode; however, the VM consists of both real mode and protected mode code. The real mode portion of the DOS VM emulates an 8086 system. However, unlike the real mode 8086, the virtual 8086 mode access to all interrupts and hardware is virtualized. Windows creates DOS virtual machines using a combination of hardware support from the microprocessor and software support from the operating system.

To create a DOS VM to run a DOS application, Windows makes a virtual copy of the conventional memory area 110 memory below the 1 MB boundary of the system VM into a region of the extended memory 125. The copied region becomes the address space of a DOS virtual machine. The Windows software maps DOS, the device drivers, and all the TSRs programs of the original real mode memory area into the DOS VM address space. Finally, the processor enters Virtual 8086 mode of the Intel TM 386 or 486 processor and executes the copy of DOS in the virtual machine. Although a normal 8086 processor can only see the real mode memory below the 1 MB boundary, the 386 or 486 processor operating in Virtual 8086 mode uses the virtual memory feature to make the DOS VM in the extended memory appear to be real mode memory.

Although the Windows enhanced mode permits storage of a number of DOS VMs concurrently, each VM operates as a separate software entity. The DOS VMs access code and data located within the 1 MB portion of system memory allocated to that DOS VM or in the conventional memory area, also called a shared portion, of system memory. Consequently, any routine calling another routine in a particular DOS VM must either reside in that DOS VM or in the shared portion of system memory. In creating each DOS VM in the Windows enhanced mode, a virtual copy is made of the conventional memory area of the system memory. Therefore, all routines residing in the conventional memory area prior to the invocation of Windows is mapped to the same location within each DOS VM. If it is desirable for a number of DOS VMs to share a routine, the shared routine may be loaded into the conventional area of memory prior to loading Windows.

Although placing the shared routine in the conventional area of memory prior to loading Windows results in accessibility of the shared routine by all the DOS VMs, there are a number of undesirable consequences of storing the shared routine in the conventional area of memory. First, if a particular DOS VM does not use or need the shared routine, then the placement of the routine in the conventional area results in needless reduction of memory for that DOS VM. Second, as illustrated in FIG. 1, the shared portion of memory is limited, and if the routine is large, the amount of shared system memory is greatly reduced. Third, routines residing in the shared portion of memory generally must run in real mode. If the code is limited to operation in real mode, then the effectiveness of the routine may be reduced.

An alternative to storing the shared routine in the conventional area of memory is to load a copy of the shared routine in each VM. Because there is a separate version of the routine in each DOS VM, state information pertaining to the corresponding routine could not be coordinated among the various copies of the routine residing in the different DOS VMs.

As will be described, the present invention allows code sharing of routines among virtual machines running in the Windows operating system enhanced mode. A single copy of each routine resides in a target VM stored in an extended portion of the computer system memory. The routines are accessible by a DOS or Windows application, even if the calling application resides in a different VM.

SUMMARY OF THE INVENTION

Therefore, it is an object of the present invention to allow code sharing among virtual machines without loading the shared code into each virtual machine.

It is a further object of the present invention to provide shared code for use among virtual machines without storing the shared code in the shared memory space of the computer system.

It is another object of the present invention to provide a single copy of shared code called by separate virtual machines which permits coordination of state information pertaining to the shared code.

This and other objects of the present invention are realized in an arrangement which includes a computer system containing an Intel ™ 80386 microprocessor as a central processing unit (CPU) coupled to system memory. The computer system runs Microsoft ™ Windows v. 3.1 in enhanced mode. The system memory is configured to include a system virtual machine (VM) and at least one DOS VM. A target VM contains shared code routines for use by all VMs loaded in the computer system. The present invention provides a means for a process within a calling VM to execute the shared code routine contained in the target VM. The present invention utilizes the capability of a Windows virtual device driver (VxD) to set-up a path from the calling VM to the target VM.

When access to the shared code routine is desired from a calling process in the calling VM, the calling VM transfers control to a shared code VxD. In addition, the calling process transfers a pointer to calling data parameters for use in conjunction with execution of the shared code routine. The shared code VxD performs data translation for the calling data parameters so that the target VM can access the data parameters. The shared code VxD invokes calls to the Windows Process scheduler to schedule the target VM and blocks selection of the calling VM. The target VM, upon invocation by the scheduler, executes the shared code routine and generates return parameters. Upon completion of the shared code routine, the thread of execution is transferred to the shared code VxD, and address translation is performed on the return parameters. The translated return data parameters are transferred to the calling process. The shared code VxD unblocks selection of the calling VM so that the calling VM is free for selection by the Windows process scheduler. When the calling VM is selected, the calling VM resumes execution just after the point it was blocked from selection. Control is then returned to the calling process.

BRIEF DESCRIPTION OF THE DRAWINGS

The objects features and advantages of the present invention will be apparent from the following detailed description of the preferred embodiment of the invention with references to the drawings in which.

NOTATION AND NOMENCLATURE

Figure 1:
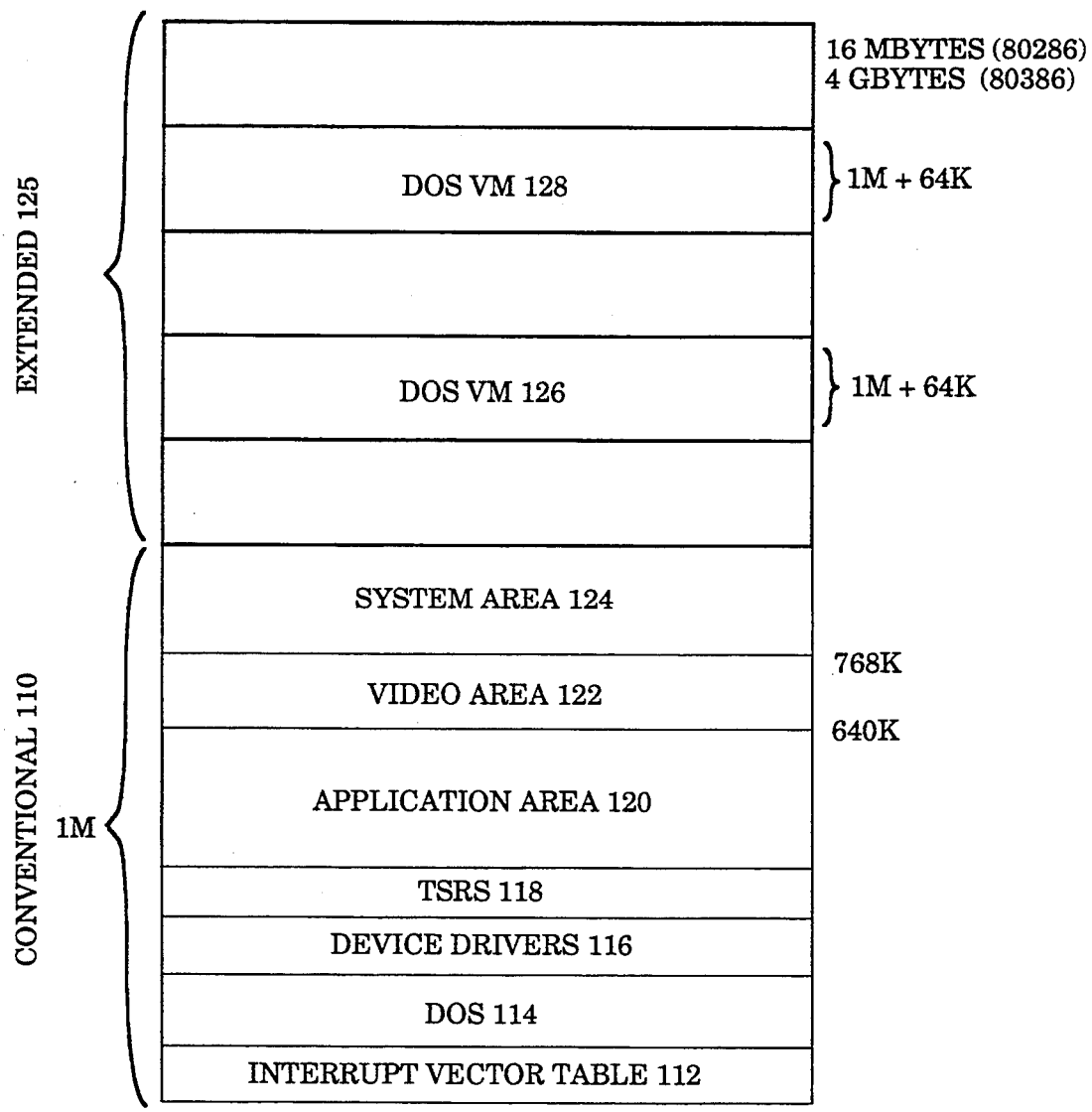
FIG. 1 illustrates a memory map for a computer system configured for running Windows v. 3.1 operating system in enhanced mode.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by Intel Corporation, as-well as other manufacturers of computer systems.

DETAILED DESCRIPTION OF THE INVENTION

A method and apparatus for sharing code among virtual machines in a preemptive multi-tasking computer system are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 2:
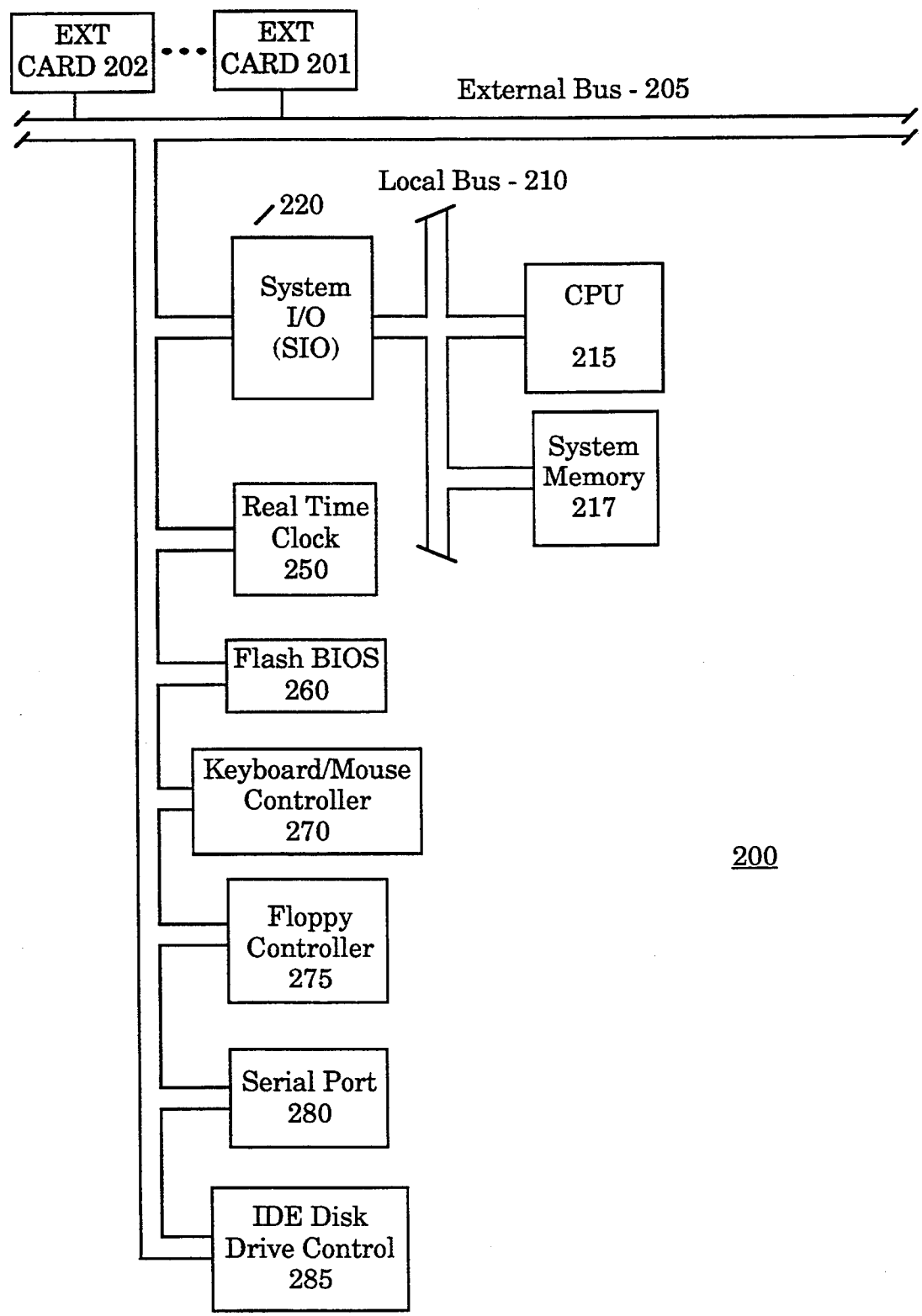
FIG. 2 illustrates a high level block diagram of a computer system incorporating the teachings of the present invention.

Referring to FIG. 2, a high level block diagram of a computer system incorporating the teachings of the present invention is illustrated. The present invention operates on a computer system 200 comprising an Intel ™ 80386 microprocessor or later revisions for a central processing unit (CPU) 215. In a simplest configuration, the CPU 215 is coupled to a system memory 217 via a local bus 210. The local bus 210 is also coupled to a system input/output (SIO) interface 220. The SIO interface 220 couples the CPU 215 and the system memory 217 to a plurality of external devices such as a real time clock 250, a flash BIOS 260, a Keyboard/Mouse controller 270, a floppy controller 275, a serial port 280 and an IDE Disk Drive Control 285. In addition, a plurality of add-on external cards for providing additional functions to computer system 200 are designated as Ext. Card 201 and 202. For example, the external cards may comprise additional memory, a modem or a network interface. These elements are those typically found in most computers and, in fact, computer system 200 is intended to be representative of a broad category of data processing devices.

The CPU 215 is capable of operating in either a real mode or in a protected mode. The real mode references the fact that all addresses to the corresponding system memory 217 refer to physical addresses. Therefore, when the CPU 215 is running under real mode, it is limited to the 8086 conventional memory space. When the processor is operating under protected mode, access to the system memory 217 is provided by a set of processor protected descriptor segments. In contrast to operation under the real mode, the protected mode permits the CPU 215 to access the entire linear address space within the system memory 217. Because of this, the real mode is limited to only providing memory management, but the protected mode provides both memory management and memory protection. The protected mode can be either 16 bit or 32 bit. Under the 16 bit mode operation, provided in conjunction with an Intel TM 80286 microprocessor, a 64k code and data segment is used. In a 32 bit protected mode, provided in conjunction with an Intel TM 80386 microprocessor, all segments of code and data are assumed to be 32 bits wide, resulting in 4 gigabyte of virtual memory. The protected mode breaks the 1 MB system memory barrier limited to real mode applications.

Figure 3:
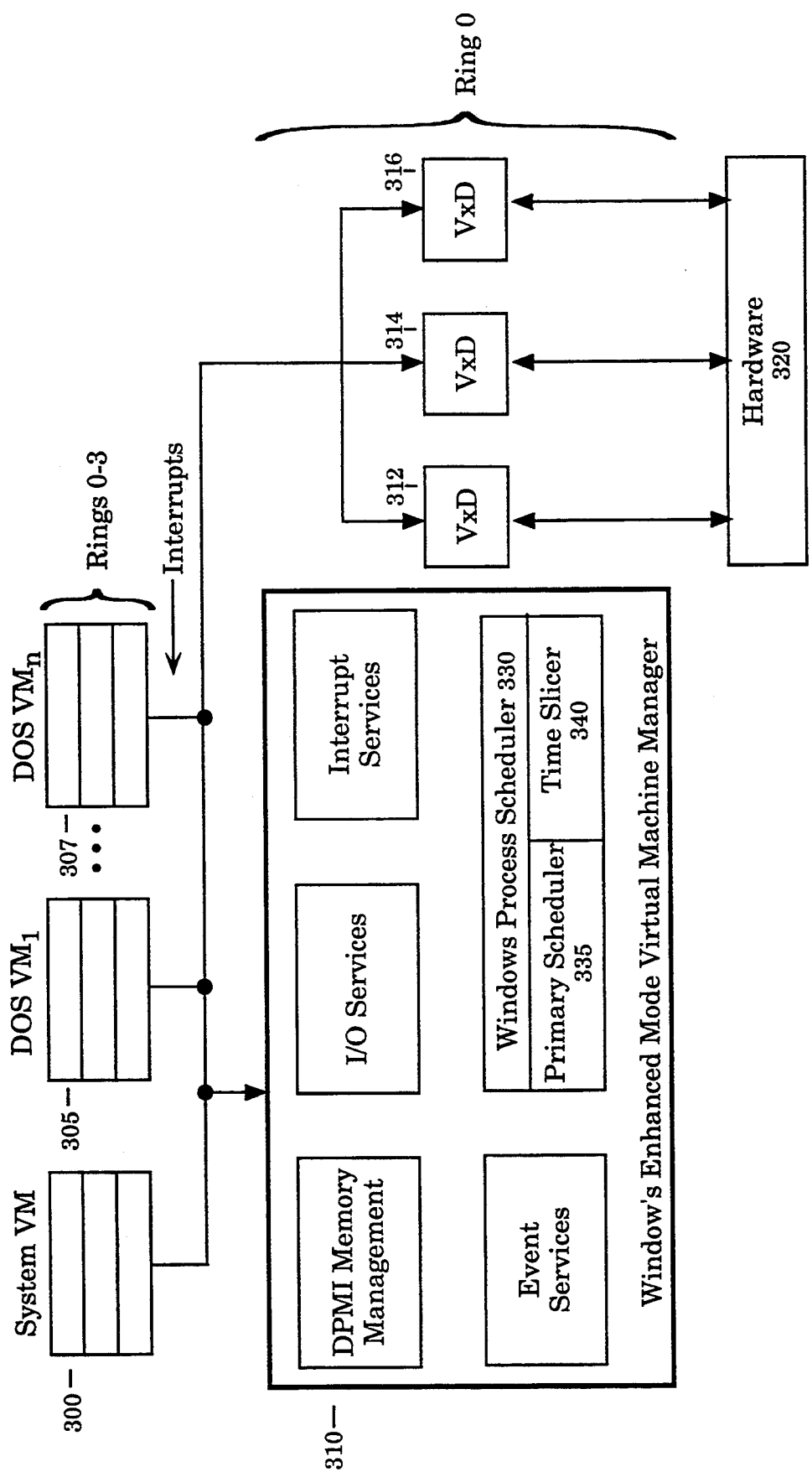
FIG. 3 illustrates a high level block diagram of Windows system software configured in accordance with the present invention.

Referring to FIG. 3, a high level system block diagram of Windows system software configured in accordance with the present invention is illustrated. The Windows system software supports a system VM 300 and a plurality of DOS VMs, 1 through n. The system and DOS VMs are coupled to a Windows virtual machine manager 310. The system VM and DOS VMs are also coupled to a plurality of virtual device drivers (VxDs) 312, 314 and 316. The Windows virtual machine manager 310 is a layer of Windows system software for coordinating the operation of each VM and VxDs active in the computer system. The Windows virtual machine manager 310 is composed of several portions. The Windows virtual machine manager 310 schedules tasks among all the DOS VMs and the system VM via a Windows Process Scheduler 330. The Windows virtual machine manager 310 may interface with any VxD installed. In addition, the Windows virtual machine manager 310 provides I/O emulation, virtual memory management, general interrupt handling and event servicing. A series of selector values provided to the Windows virtual machine manager 310 results in direct access of physical locations in the lower one megabyte of memory portion. Memory management under Windows basically consists of a kernel map manager and a Windows virtual machine manager including the DOS protected mode interface (DPMI).

The Intel TM 80386 and 80486 microprocessors provide system memory protection through segmentation and paging. The protection levels are represented by a four ring system. The lower the number of the ring the higher the privilege rating. Therefore, ring 0, as shown in FIG. 3, is used for the virtual device drivers in other essential components of the operating system including the Windows virtual machine manager 310. The Windows v 3.1 enhanced mode runs all Windows applications and DOS VMs at level 3. The Intel TM 80386 and 80486 protected mode processors provide the capability for preemptive hardware based multi-tasking among virtual machines. In preemptive multi-tasking, a switch between tasks is forced resulting in the active task involuntarily relinquishing control of the system. In non-preemptive multi-tasking, the active task must voluntarily relinquish control of the system. The present invention utilizes the preemptive multi-tasking capability of Windows version 3.1 enhanced mode. The preemptive multi-tasking in the Windows enhanced mode is accomplished through selection of VMs via a round-robin technique. However, multiple Windows applications within the system VM are non-preemptive in that the active Windows application must voluntarily relinquish control to system.

A plurality of virtual device drivers (VxD) are also shown in FIG. 3. The VxDs are not contained in a VM, but are contained in a ring 0. In Windows enhanced mode, the VxDs provide a 32 bit flat model program. The VxDs are loaded along with the Windows 3.1 while the system is still in real mode. In general, the VxD serializes access to hardware by providing a buffer between the system drivers and hardware devices. The VxD, running at ring level 0, has access to the entire 4 gigabyte address space, as well as all the VMs at all times. This permits bridging among virtual machines as explained more fully below. For further information concerning the Windows v 3.1 enhanced mode, see *Guide to Programming,* Microsoft Windows Software Development Kit, Microsoft, 1987–1992, and *Programming Windows* 3.1, 3rd edition, Charles Petzold, Microsoft Press, 1992.

Figure 4:
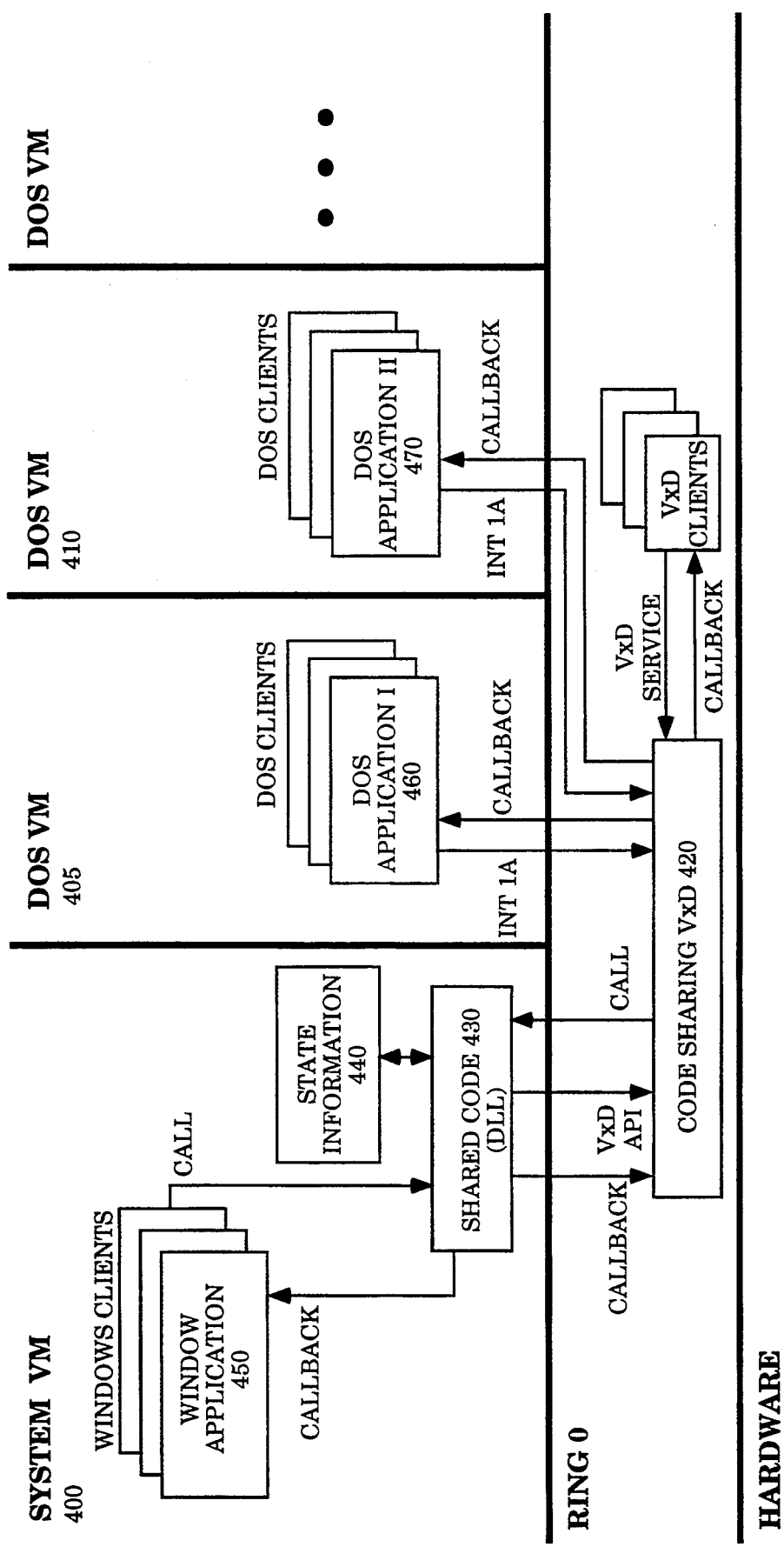
FIG. 4 illustrates a block diagram of computer system software configured in accordance with the present invention.

Referring to FIG. 4, a block diagram of computer system software configured in accordance with the present invention is illustrated. The system software, residing in the system memory, comprises a system VM 400 and a plurality of DOS VMs including DOS VMs 405 and 410. The system also includes a code sharing VxD 420 coupled to a plurality of VxD clients, the DOS VMs and the system VM 400. The operation of code sharing VxD 420 is explained below. A plurality of Windows applications and dynamic link libraries (DLLs) reside within the system VM 400. The Window applications 450 on the system VM 400 are referred to as "tasked executables". The Windows applications are driven by a single task in response to a series of external events. In contrast, the DLLs sometimes are referred to as non-task executable. The DLLs are driven by the task of the calling application. Because of this, DLLs rotate around Windows client applications. A DLL provides a guaranteed source of callable libraries containing functions and resources. In a preferred embodiment of the present invention, shared code DLLs 400 contain shared code routines that are accessible by all VMs in the computer system. The shared code DLLs maintain state information 440. The shared code DLLs 430 may contain routines for performing any functions; however the most utility is gained when it is desirable for all VMs to access the functions.

Figure 5:
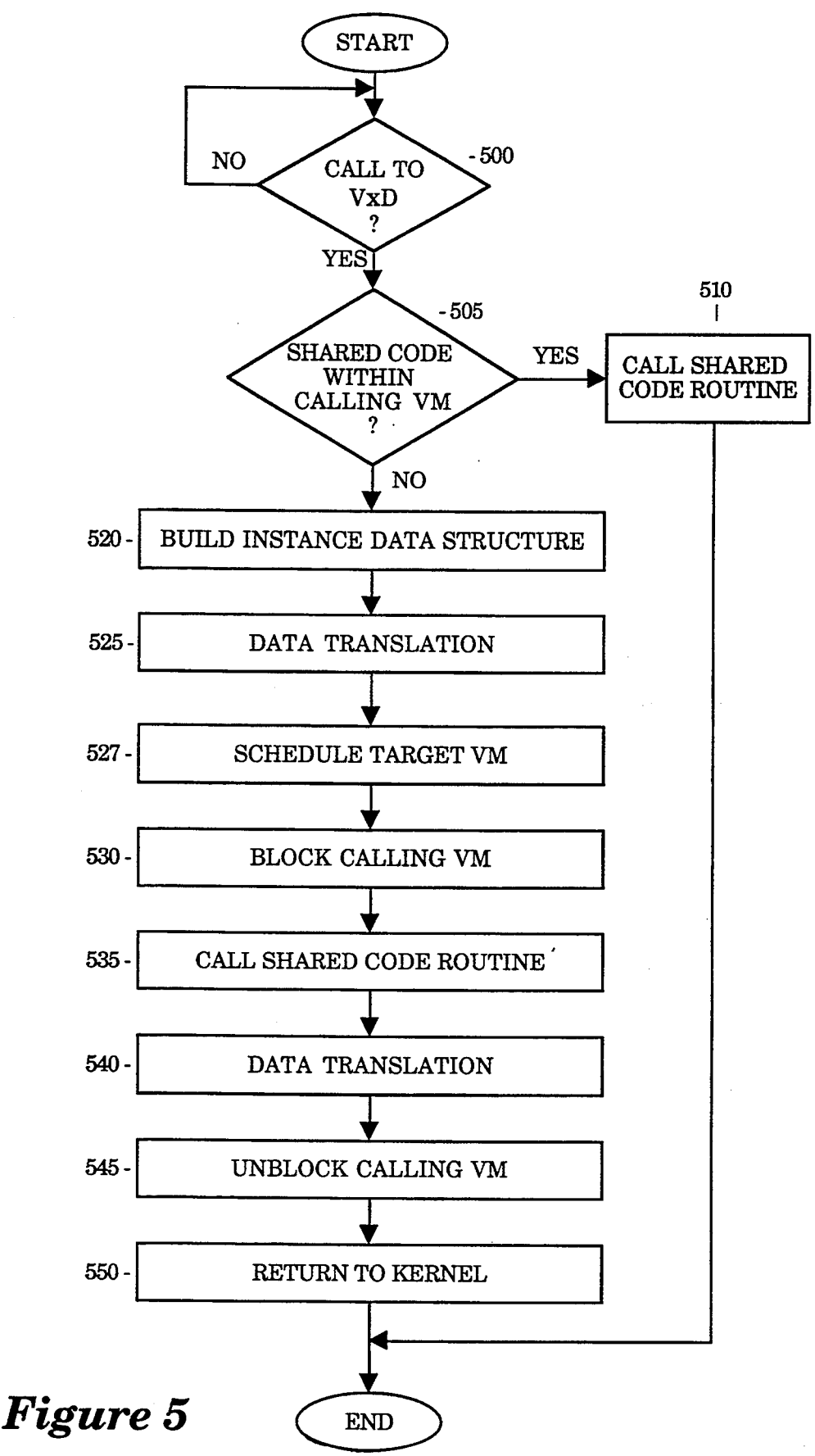
FIG. 5 illustrates a flow diagram for the method of code sharing incorporating the teachings of the present invention.

Referring to FIG. 5, a flow diagram for the method of code sharing incorporating the teaching of the present invention is illustrated. The present invention provides a method and apparatus to share executable code among different virtual machines. Conceptually, the methods and apparatus provide the effect that the shared code resides within the same VM as a process calling the shared code or within shared memory accessible to all processes in the computer system. However, providing a copy of a shared code routine in every VM results in duplication of code. In addition, state information pertaining to the shared code can not be altered in accordance with execution of the shared code. In the present invention, the shared code may reside in any virtual machine including a DOS VM or a system VM. Because the shared code segment resides in a single VM, the shared code routine does not consume precious memory space under the 1 MB region of memory. In a preferred embodiment of the present invention, the system VM containing the shared code routine provides corresponding state information. Therefore, having a single version of the shared code routine allows for dynamic alternation of state information pertaining to the shared code routine by each different applications.

In general, the present invention provides a means for a process within a calling virtual machine (VM) to execute code contained in a target virtual machine (VM). The present invention utilizes the capability of a Windows virtual device driver (VxD) to set-up a path from the calling VM to the target VM. When access to the shared code routine is desired from a calling process in the calling VM, the calling VM transfers control to a shared code VxD. In addition, the calling process transfers a pointer to calling data parameters for use in conjunction with execution of the shared code routine. The shared code VxD performs data translation for the calling data parameters so that the target VM can access the data parameters. The shared code VxD invokes a Windows system "Call_Priority_VM_Event" to the Windows Process scheduler to schedule the target VM. Then the shared code VxD invokes a Windows system call "Wait_Semaphore" to block selection of the calling VM. The target VM, upon invocation by the scheduler, executes the shared code routine and generates return parameters. Upon completion of the shared code routine, the thread of execution is transferred to the shared code VxD, and address translation is performed on the return parameters. The translated return data parameters are transferred to the calling process. The shared code VxD contains a "Signal_Semaphore" call that unblocks selection of the calling VM so that the calling VM is free for selection by the Windows process scheduler. When the calling VM is selected, the calling VM resumes execution at the point just after it was blocked. The shared code VxD then returns control to the calling process in the calling VM.

The methods and apparatus for code sharing of the present invention are accomplished through routines contained within the shared code VxD. Specifically, the shared code VxD contains an application program interface to a calling client entitled "Client API", and a routine to call the shared code routine entitled "Call SC". In general, there are two ways to transfer the thread of execution from an application process operating within a VM to a VxD. In a preferred embodiment, a software interrupt is used to transfer the thread of execution from an application running in a VM to a VxD. To call the shared code routine from the calling process, the calling process generates an INT 1A interrupt. The interrupt exception handler, within the calling VM, is set-up during system initialization to "hook" the shared code VxD. With this configuration, the thread of execution is transferred to the shared code VxD when an INT 1A interrupt is generated by a DOS VM. Alternatively, the VxD can export an entry point in any virtual machine by using standard windows system mechanisms.

Upon receipt of the INT 1A interrupt, the Client API routine within the shared code VxD is executed. First, the Client API routine determines whether the shared code resides within the calling VM. If the shared code routine resides within the calling VM, then the Client API routine directs control to the shared code routine within the calling VM. If the shared code routine resides outside the calling VM, then the client API performs the necessary operations to call the shared code routine located in the target VM. In order to create a path from the calling VM to the target VM, the client API routine builds an instance data structure. The Client API utilizes the Windows system call "List_Allocate" to allocate memory for the instance data structure. The memory for the instance data structure must be reserved for the particular calling VM to target VM routing because the present invention operates in a pre-emptive multi-tasking environment. Therefore, if another call to the shared code VxD is made from another calling VM, the data structure generated for the first call to the shared code VxD remains unaltered. The instance data structure contains an identification of the target VM and calling VM, an address to the calling VM data parameters, and a handle to a semaphore. In addition, the instance data structure contains an area of memory for data translation. The data translation function performed in the Client API routine is described more fully below.

In order to provide the proper path from the calling VM to the target VM, the API routine in the shared code VxD schedules the target VM with the Windows process scheduler. Generally, the Windows process scheduler, which contains a primary scheduler and a time slicer, dispatches control to the CPU on a round-robin basis. Whenever a VM is dispatched by the primary scheduler, the time slicer determines how long the scheduled VM runs unhindered. Through use of the time slicer, the shared code VxD specifies a scheduling priority for the target VM. In a preferred embodiment, the shared code VxD specifies a high priority for scheduling the target VM so as to expedite switching of control from the calling VM to the target VM. The scheduling of the target VM is accomplished by the Client API routine via the Windows system call "Call_Priority_VM_Event". In addition to scheduling the target VM, the Client API specifies any conditions for the scheduling of the target VM. For example, conditions for scheduling the target VM include whether any particular interrupts occur, or whether the processor is executing within a critical section.

In the Windows enhanced mode environment, the shared code VxD is operating on behalf of the calling VM. A semaphore is created by the Client API routine to identify the calling VM to the Windows process scheduler. The client API, having the handle to the semaphore stored in the instance data structure, performs the Windows system call "Wait_Semaphore" to block on the calling VM semaphore. The block on the semaphore to the calling VM inhibits the Windows process Scheduler from selecting the calling VM for operation. Therefore, blocking the task from the Window scheduler alleviates the risk that the thread of execution will return to the calling VM before completion of the shared code routine called by the calling VM.

In a preferred embodiment of the present invention, once the client API routine blocks on the calling VM, control is transferred to the Windows process scheduler. When the Windows process scheduler selects the target VM as the active task, execution begins at a "Call SC" routine also residing in the shared code VxD. The Call SC routine in the shared code VxD is operating on behalf of the target VM. The Call SC routine receives a pointer to the instance data structure created in the client API routine. As discussed above, the instance data structure contains, in part, a pointer to the calling data parameters from the calling process in the calling VM. The data translation required for the calling VM to target VM routing is dependent upon the processor modes of the calling and target VMs. Therefore, the Call SC routine determines the processor mode of operation for the calling VM and the target VM. There are three cases for sharing code among VMs in the present invention. First, the calling VM comprises a DOS VM operating in virtual 8086 mode and the target VM comprises the system VM operating in protected mode. Second, the calling and the target VMs both comprise DOS VMs operating in virtual 8086 mode. Third, the calling VM comprises the system VM operating in protected mode and the target VM is a DOS VM operating in virtual 8086 mode. In the preferred embodiment of the present invention, the shared code routines are implemented as DLLs and therefore reside in the system VM.

If the calling VM is a DOS VM operating in virtual 8086 mode and the target VM is the system VM operating in the 16 bit protected mode, then two types of data translation is required. The pointer to the data parameters are translated from a virtual 8086 mode format,to a 16 bit protected mode format. If the calling VM that generated the data parameters is a DOS VM, and the shared code resides in a windows application in the system VM, the Call SC routine translates the pointer to the parameter data from real mode memory segmentation to a protected mode format. To accomplish this task, the Call SC routine takes a real mode segment:offset pointer and creates a protected mode selector:offset pointer. The Call SC routine creates protected mode selectors for each calling data parameter. The Windows enhanced mode provides an "_Allocate_LDT_selector" system call for the allocation of selectors. The protected mode selectors provide protected mode addressing information depending upon the location of the calling data parameters. Upon generation of all the protected mode selectors, the Call SC routine creates a new argument packet comprising the selector:offset pointer pairs for each calling data parameter.

As described above, each DOS VM is operating in 8086 virtual mode which simulates real mode operation. The DOS VMs are mapped into the linear virtual memory space of the system memory. The memory locations in the DOS VMs are provided relative to the particular calling DOS VM. For example, the virtual 8086 mode address segment 100:0 refers to a different address for each DOS VM because the address is relative to a zero or beginning memory location for the particular DOS VM. Therefore, in order to transfer the calling data parameters from the calling DOS VM to the target system VM, the Call SC routine performs address translation or VM memory translation. In addition to providing mode format translation for the calling data parameters, the Call SC routine adds an offset derived from the identification of the calling VM to identify the zero or beginning memory location of the calling VM. The Call SC routine data translations permit the shared code routine in the target VM to access the data parameters generated by the process in the calling VM.

If the calling VM is a DOS VM, operating in virtual 8086 mode, and the target VM is also a DOS VM operating in the virtual 8086 mode, then the Call SC routine first performs VM memory translation. The pointer to the calling data parameters, after the VM memory translation, points to a flat linear address that the shared code VxD can directly access. As described above, the CPU, when executing a task virtual 8086 mode, is restricted to accessing only system memory within that DOS VM and the shared real mode portion. Therefore, if the target VM comprising the shared code is a DOS VM, the data parameters are copied to an available area in low memory. The Windows system maintains a translation buffer in each VM below the 1 MB area. To copy the data parameters into the target VM, the Call SC routine performs the Windows system call "V86MMGR_Allocate_Buffer" to allocate the translation buffer in the target VM. The size of the translation buffer is initially fixed, however the default size may be increased during system initialization. The Call SC routine in the shared code VxD copies the data from the calling DOS VM to the target VM.

If the calling VM is a system VM operating in the 16 bit protected mode and the target VM is a DOS VM operating in virtual 8086 mode, then the Call SC routine translates the pointer from a protected mode format to a real mode format. In addition, as described above in conjunction with the DOS VM to DOS VM case, the Call SC routine allocates from the Windows system a translation buffer in the target DOS VM, and then copies the data parameters to the translation buffer.

After a new argument with the appropriately translated data parameters is created, the shared code routine residing in the target VM is called. The shared code routine is called from the Call SC routine in the shared code VxD via a number of Windows nested execution functions. Once the target VM receives control of the system from the Windows scheduler, a call is made to the shared code routine similar to the operation of a software interrupt. The shared code routine is executed in the target VM. As shown in FIG. 4, the shared code routine is conceptually coupled to a state information area of memory. The state information permits the shared routine to dynamically reflect operation in conjunction with the various calling VMs in the computer system. The shared code generates parameters for return to the calling process in the calling VM. In general, when execution of the shared code is completed, control is returned to the Call SC routine in the shared code VxD.

Upon return of control to the Call SC routine in the code sharing VxD, data translation for the return data parameters is required. In the preferred embodiment of the present invention, the shared code resides in the system VM. For this case, data translation is required for the system VM to DOS VM routing. To accomplish this, the Call SC routine translates the pointer from a 16 bit protected mode format to a virtual 8086 mode format. If the target VM is a DOS VM, operating in the virtual 8086 mode, and the calling VM is also a DOS VM operating in the virtual 8086 mode, then the Call SC routine performs VM memory translation as described above. In the third case, if the target VM is a DOS VM operating in virtual 8086 mode and the calling VM is the system VM operating in the 16 bit protected mode, then the return data pointer is converted from virtual 8086 mode to the 16 bit protected mode. In addition, VM memory translation is required.

After the return data parameters are translated, the Call SC routine unblocks the semaphore by calling the Windows system call "Signal_Semaphore". Unblocking the semaphore for the calling VM enables selection of the calling VM by the Windows process scheduler. Finally, the Call SC routine returns control to the Windows process scheduler. When the calling VM is selected to run by the Windows process scheduler, control returns to the point in the Client API routine directly following the "Wait_Semaphore_Call. Once gaining system control, the Client API routine frees up any selectors that were initially used to translate the pointer to the data parameters from virtual 8086 mode to protected mode, and the API routine destroys the semaphore. In addition, the data contents located in the instance data structure are removed and placed in the calling data structure. Since the instance data structure is no longer required by the shared code VxD, the API routine makes a Windows "List_Deallocate" call to reallocate the area of memory initially allocated for the instance data structure. At this point, the shared code VxD returns control to the calling process. Therefore, the execution of the shared code routine in a different VM then the calling process is transparent to the calling process.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a multi-tasking computer system comprising a central processing unit (CPU) and a system memory operating in a Windows enhanced mode operating system environment, a method for sharing code between more than one virtual machine (VM) operating in said multi-tasking computer system, said method comprising the steps of:

loading into said system memory at least one calling virtual machine (VM) comprising a calling process and a target virtual machine (VM) comprising a shared code routine;

loading into said system memory a shared code virtual device driver (VxD) capable of being called from both said calling VM and said target VM;

executing said calling process in said multi-tasking computer system;

transferring control of said multi-tasking computer system from said calling process in said calling VM to said shared code VxD when access to said shared code routine is desired;

storing information to identify said calling VM and said target VM including storing a handle to a semaphore to identify said calling VM to said Windows enhanced mode operating system;

scheduling said target VM with said Windows enhanced mode operating system;

transferring control of said multi-tasking computer system from said shared code VxD to said target VM when said Windows enhanced mode operating system selects said target VM as an active task;

blocking on said calling VM based on said handle to said semaphore such that said Windows enhanced mode operating system does not select said calling VM as an active task;

calling said shared code routine in said target VM;

executing said shared code routine;

calling said shared code VxD from said target VM;

unblocking said calling VM such that said Windows enhanced mode operating system may select said calling VM as an active task; and transferring control from said target VM to said Windows enhanced mode operating system such that selection of said calling VM by said Windows enhanced mode operating system as an active process results in resuming execution in said calling VM.

2. The method for sharing code in a multi-tasking computer system as claimed in claim 1 wherein the step of transferring control from said calling VM to said shared code VxD when access to said shared code routine is desired comprises the steps of:

generating, during initialization of said multi-tasking computer system, an interrupt exception handler within said calling VM to hook the shared code VxD upon generation of a specified software interrupt; and generating said specified software interrupt in said calling process when access to said shared code routine is desired.

3. The method for sharing code in a multi-tasking computer system as claimed in claim. 1, further comprising the steps of:

generating calling data parameters during execution of said calling process;

passing said calling parameters to said shared code VxD;

translating said calling data parameters to a format compatible with said target VM to generate translated calling data parameters;

storing said translated calling data parameters;

passing said translated calling parameters to said shared code routine;

generating return data parameters during execution of said shared code routine;

translating said return data parameters to a format compatible with said calling VM to generate translated return data parameters;

storing said translated return data parameters; and passing said translated return data parameters to said calling process.

4. The method for sharing code in a multi-tasking computer system as claimed in claim 3 wherein the step of storing information to identify said calling VM and said target VM comprises the steps of:

allocating memory for an instance data structure, said instance data structure being utilized for a single access to said shared code routine;

storing identifications of said calling VM and said target VM in said instance data structure;

storing an address to said calling data parameters in said instance data structure; and storing said handle to said semaphore in said instance data structure.

5. The method for sharing code in a multi-tasking computer system as claimed in claim 3 wherein the steps of loading into said system memory at least one calling virtual machine (VM) and a target virtual machine (VM) comprises the steps of:
   loading a disk operating system (DOS) VM as a calling VM operating in a virtual 8086 mode of said CPU, said DOS VM comprising a DOS application; and
   loading a system VM as a target VM operating in protected mode of said CPU, said system VM comprising said Windows enhanced mode operating system and at least one Windows applications.

6. The method for sharing code in a multi-tasking computer system as claimed in claim 5 wherein said shared code routine comprises a Windows operating system dynamic link library (DLL) routine.

7. The method for sharing code in a multi-tasking computer system as claimed in claim 5 wherein the step of translating said calling data parameters to a format compatible with said target VM comprises the steps of:
   translating an address to said calling data parameters from a real mode segment:offset pointer to a selector:offset pointer;
   deriving an offset value to identify a beginning memory location of said calling VM; and
   adding said offset value identifying said beginning memory location of said calling VM to said selector:offset pointer.

8. The method for sharing code in a multi-tasking computer system as claimed in claim 3 wherein the steps of loading into said system memory at least one calling virtual machine (VM) and a target virtual machine (VM) comprises the steps of:
   loading a disk operating system (DOS) VM as a calling VM operating in an virtual 8086 mode of said CPU; and
   loading a disk operating system (DOS) VM as a target VM operating in an virtual 8086 mode of said CPU.

9. The method for sharing code in a multi-tasking computer system as claimed in claim 8 wherein the step of translating said calling data parameters to a format compatible with said target VM comprises the steps of:
   translating an address to said calling data parameters from a real mode segment:offset pointer to a selector:offset pointer;
   allocating a translation buffer accessible to said target VM; and
   copying said calling data parameters from said calling VM to said translation buffer using said selector:offset pointer.

10. The method for sharing code in a multi-tasking computer system as claimed in claim 3 wherein the steps of loading into said system memory at least one calling virtual machine (VM) and a target virtual machine (VM) comprises the steps of:
    loading a system VM as a calling VM operating in a protected mode of said CPU; and
    loading a disk operating system (DOS) VM as a target VM operating in a virtual 8086 mode of said CPU.

11. The method for sharing code in a multi-tasking computer system as claimed in claim 10 wherein the step of translating said calling data parameters to a format compatible with said target VM comprises the steps of:
    translating an address to said calling data parameters from a selector:offset pointer to a real mode segment:offset pointer;
    allocating a translation buffer accessible to said target VM; and
    copying said calling data parameters from said calling VM to said translation buffer using said segment:offset pointer.

12. In a multi-tasking computer system comprising a central processing unit (CPU) and a system memory operating in a Windows enhanced mode operating system environment, a method for sharing code between more than one virtual machine (VM) operating in said multi-tasking computer system, said method comprising the steps of:
    loading into said system memory at least one calling virtual machine (VM) comprising a calling process and a target virtual machine (VM) comprising a shared code routine;
    loading into said system memory a shared code virtual device driver (VxD) capable of being called from said calling VM and said target VM;
    generating, during initialization of said multi-tasking computer system, an interrupt exception handler within said calling VM to hook the said shared code VxD upon generation of a specified software interrupt;
    executing said calling process in said multi-tasking computer system;
    transferring control of said multi-tasking computer system from said calling process in said calling VM to said shared code VxD by said calling process generating said specified software interrupt when access to said shared code routine is desired:
    building an instance data structure to store information to identify said calling VM and said target VM including a handle to a semaphore to identify said calling VM to said Windows enhanced mode operating system, said instance data structure being utilized for a single access to said shared code routine;
    scheduling said target VM with said Windows enhanced mode operating system;
    transferring control of said multi-tasking computer system from said shared code VxD to said target VM when said Windows enhanced mode operating system selects said target VM as an active task;
    blocking on said calling VM based on said handle to said semaphore stored in said instance data structure such that said Windows enhanced mode operating system does not select said calling VM as an active task;
    calling said shared code routine in said target VM;
    executing said shared code routine;
    calling said shared code VxD from said target VM;
    unblocking said calling VM such that said Windows enhanced mode operating system may select said calling VM as an active task; and
    transferring control from said target VM to said Windows enhanced mode operating system such that selection of said calling VM by said Windows enhanced mode operating system as an active process results in resuming execution in said calling VM.

13. The method for sharing code in a multi-tasking computer system as claimed in claim 12 wherein the steps of loading into said system memory at least one calling virtual machine (VM) and a target virtual machine (VM) comprises the steps of:

loading a disk operating system (DOS) VM as a calling VM operating in a virtual 8086 mode of said CPU, said DOS VM comprising a DOS application; and loading a system VM as a target VM operating in protected mode of said CPU, said system VM comprising said Windows enhanced mode operating system and at least one Windows applications.

14. The method for sharing code in a multi-tasking computer system as claimed in claim 13 wherein said shared code routine comprises a Windows operating system dynamic link library (DLL) routine.

15. The method for sharing code in a multi-tasking computer system as claimed in claim 12 wherein the steps of loading into said system memory at least one calling virtual machine (VM) and a target virtual machine (VM) comprises the steps of:

loading a disk operating system (DOS) VM as a calling VM operating in an virtual 8086 mode of said CPU; and loading a disk operating system (DOS) VM as a target VM operating in a virtual 8086 mode of said CPU.

16. The method for sharing code in a multi-tasking computer system as claimed in claim 12 wherein the steps of loading into said system memory at least one calling virtual machine (VM) and a target virtual machine (VM) comprises the steps of:

loading a system VM as a calling VM operating in a protected mode of said CPU; and loading a disk operating system (DOS) VM as a target VM operating in an virtual 8086 mode of said CPU.

* * * * *

UNITED STATES PATENT AND TRADEMARK OFFICE
CERTIFICATE OF CORRECTION

PATENT NO. : 5,414,848
DATED : May 9, 1995
INVENTOR(S) : Sandage et al.

It is certified that error appears in the above-indentified patent and that said Letters Patent is hereby corrected as shown below:

In the title at [54] delete "Muli-Tasking" and insert --Multi-Tasking--

In column 1 at line 6 delete "Muli-Tasking" and insert --Multi-Tasking--

Signed and Sealed this

Fifteenth Day of October, 1996

Attest:

BRUCE LEHMAN

Attesting Officer     Commissioner of Patents and Trademarks